United States Patent Office 3,454,533
Patented July 8, 1969

3,454,533
COATING COMPOSITIONS COMPRISING SOLUTIONS OF ISOCYANATE-TERMINATED POLYURETHANES AND POLYISOCYANATES CONTAINING ISOCYANURATE RINGS
Vincent Kerrigan, Gordon Trappe, and William Ian Williamson, Blackley, Manchester, England, assignors to Imperial Chemical Industries Limited, London, England, a corporation of Great Britain
No Drawing. Continuation of application Ser. No. 299,151, Aug. 1, 1963. This application May 31, 1966, Ser. No. 553,710
Claims priority, application Great Britain, Aug. 9, 1962, 30,626/62
Int. Cl. C08g 22/10; C09d 3/72
U.S. Cl. 260—75                                          3 Claims

ABSTRACT OF THE DISCLOSURE

New compositions for the preparation of surface coatings and lacquers which contain an isocyanate-ended polyurethane of average molecular weight more than 1000, an organic polyisocyanate containing isocyanurate rings and having an average of more than two isocyanate groups per molecule, and a solvent inert to isocyanates.

DISCLOSURE

This application is a continuation of application Ser. No. 299,151, filed Aug. 1, 1963 now abandoned.

Coating compositions based on polyurethanes are well known but in general suffer from the disadvantage of having to be prepared by mixing controlled proportions of polyisocyanates and isocyanate-reactive components immediately before use. This disadvantage can be overcome by manufacturing isocyanate-ended polyurethanes which are storage stable and coatings of which dry under the influence of atmospheric moisture without the addition of a second component. We have now found that certain mixtures of isocyanate-ended polyurethanes and polyisocyanates are particularly suitable for the preparation of surface coatings and adhesives since the compositions are storage stable and dry rapidly to afford coatings of exceptionally good properties.

According to our invention we provide new compositions for the preparation of surface coatings and lacquers which contain an isocyanate-ended polyurethane of average molecular weight more than 1000, an organic polyisocyanate containing isocyanurate rings and having an average of more than two isocyanate groups per molecule, and a solvent inert to isocyanates.

The isocyanate-ended polyurethanes of molecular weight more than 1000 may be obtained by interaction of a molecular excess of an organic polyisocyanate with a polyhydroxy compound of molecular weight greater than 400, and preferably between 400 and 5000, optionally in conjunction with a hydroxy compound of molecular weight below 400.

As polyhydroxy compounds of molecular weight greater than 400, there may be mentioned polyethers, polyetherthioethers, polyesters and polyacetals. These polymers should preferably be linear or only slightly branched. Polymers which are substantially branched are however satisfactory if a large excess of polyisocyanate is used in preparing the isocyanate-ended polyurethane in order to avoid gelled insoluble products.

As polyethers there may be mentioned polymers and copolymers of cyclic oxides, for example 1:2-alkylene oxides such as ethylene oxide, epichlorohydrin, 1:2-propylene oxide, 1:2-butylene oxide and 2:3-butylene oxide, oxycyclobutane and substituted oxycyclobutanes, and tetrahydrofuran. There may be mentioned polyethers such as are prepared for example by the polymerization of an alkylene oxide in the presence of a basic catalyst and water, glycol, a polyhydric alcohol such as a glycerol, or a primary monoamine. Mixtures of such polyethers may be used. The preferred polyethers are polypropylene ether polymers and have an equivalent weight per hydroxyl group of between 200 and 1500.

As polyether-thioethers there may be mentioned tne products of the self-condensation of thioglycols such as thiodiglycol or of the condensation of thioglycols with glycols or other polyhydric alcohols.

The polyesters may be made by conventional means from for example dicarboxylic acids and dihydric alcohols. Suitable dicarboxylic acids include succinic, glutaric, adipic, pimelic, suberic, azelaic, sebacic, phthalic, isophthalic, and terephthalic acids and mixtures of these. Small proportions of polycarboxylic acids such as trimesic acid may also be used. Suitable glycols include ethylene glycol, 1:2-propylene glycol, diethylene glycol, dipropylene glycol, trimethylene glycol, 1:2-, 1:3-, 2:3-, and 1:4-butylene glycols, neopentyl glycol, pentamethylene glycol, and hexamethylene glycol and mixtures of these. Small proportions of polyols containing more than two hydroxyl groups, for example glycerol, trimethylolpropane or pentaerythritol may also be used. It is preferred that the acid value of the polyester be less than 5.0. The preferred polyesters have melting points below 60° C. and are derived from glycols having from two to eight carbon atoms and dicarboxylic acids having from four to ten carbon atoms. Particularly suitable are polyesters of molecular weight between 500 and 2500 derived from such dicarboxylic acids, especially adipic acid, and a glycol or mixture of glycols at least one of which contains at least one secondary hydroxyl group.

As polyacetals there may be mentioned the reaction products of aldehydes, such as formaldehyde, acetaldehyde and butyraldehyde, with dihydric alcohols such as ethylene glycol, propylene glycol, butylene glycol, and diethylene glycol.

The hydroxy compound of molecular weight below 400 which may optionally be condensed with the polyisocyanate in conjunction with the polyhydroxy compound may be monofunctional alcohol such as methanol, ethanol or butanol, or a glycol such as ethylene glycol, diethylene glycol, butylene-1:3-glycol, trimethylene glycol, tetramethylene glycol, propylene glycol, dipropylene glycol, neopentyl glycol and thiodiglycol, or a polyol such as glycerol, trimethylolethane, trimethylolpropane, hexanetriol, pentaerythritol, sorbitol or mannitol.

The organic polyisocyanate used in preparing the isocyanate-ended polyurethane may be for example an aliphatic or cycloaliphatic diisocyanate such as hexamethylene diisocyanate, 2:4-diisocyanato-1-methylcyclohexane, 2:6-diisocyanato-1-methylcyclohexane, diisocyanatocyclobutanes, tetramethylenediisocyanate, o-, m- and p-xylylenediisocyanates, dicyclohexylmethanediisocyanates, dimethyldicyclohexylmethanediisocyanates, or an aromatic polyisocyanate such as tolylene-2:4-diisocyanate, tolylene-2:6-diisocyanate, diphenylmethane-4:4'-diisocyanate, 3-methyldiphenylmethane-4:4-diisocyanate, m- and p-phenylenediisocyanate, chlorophenylene-2:4-diisocyanate, naphthalene-1:5-diisocyanate, diphenyl-4:4'-diisocyanate, 4:4'-diisocyanato-3:3'-dimethyldiphenyl, 1:3:5 - triisopropylbenzene-2:4-diisocyanate and diphenyletherdiisocyanates and mixtures of these. Alternatively it may be a polyurethane polyisocyanate obtained by interaction of excess of a polyisocyanate, such as those hereinbefore described, with a polyhydroxy compound such as ethylene glycol, butylene glycol, diethylene glycol, neopentyl glycol, trimethylolpropane, glycerol or hexanetriol. If desired the polyisocyanate may be polymerised to afford polyisocyanates containing isocyanurate rings, for example as described in U.K. patent specification No. 809,809. There may be used polyisocyanates containing allophanate groups prepared from polyurethane polyisocyanates and polyisocyanates as described in U.K. patent specification No. 994,890. There may also be used polyisocyanates containing biuret groups which may be prepared from polyisocyanates and water as described in U.K. patent specification Nos. 889,050 and 876,503.

The preparation of the isocyanate-ended polyurethane is carried out in conventional manner usually by heating the ingredients together at a temperature between 40° C. and 160° C. and preferably between 70° C. and 130° C. The reaction may be carried out in a solvent inert to isocyanates, particularly suitable solvents being esters, ketones and halogenated hydrocarbons. It is usually preferred that the reaction is carried out under slightly acidic conditions to minimise side reactions leading to high viscosity products. Although polyisocyanates are usually acidic it may be necessary in order to ensure acidity of the reaction mixture to add an acidic compound such as a mineral or organic acid or acid halide in amount equivalent to 0.005% calculated as chlorine on the weight of polyisocyanate present. In order to ensure that the polyurethane possesses terminal isocyanate groups the amount of polyisocyanate used in its preparation should be such that there is an excess of isocyanate groups over that required to react with the hydroxyl groups present.

Conventional catalysts such as organic or inorganic basic compounds or organic metallic compounds may be added to the reaction mixture but in these cases it is necessary to stop the reaction as soon as a product of the desired properties is obtained and to neutralise immediately the catalyst, for example by the addition of acidic compounds, as the catalyst may affect the stability of the isocyanate-ended polyurethane or the compositions obtained therefrom.

Particularly useful isocyanate-ended polyurethanes are obtained from organic polyisocyanates and polyesters or mixtures of polyesters with a hydroxy compound of low molecular weight wherein the polyester or mixture possesses an average of not more than three hydroxyl groups per molecule and the organic polyisocyanate is a diisocyanate used in amount so that there are from 1.05 to 2.0 and preferably from 1.2 to 1.5, isocyanate groups for each hydroxyl group.

The isocyanate-ended polyurethanes so obtained may if desired be modified before use in the compositions of our invention by, for example, partial polymerisation to afford polyisocyanates containing isocyanuric acid rings or interaction with polyisocyanates to afford allophanate polyisocyanates as described in U.K. patent specification No. 994,890.

If desired, for example in order to avoid toxic hazard, the isocyanate-ended polyurethanes may be treated to remove unreacted polyisocyanate by extraction with solvent, thin film distillation, or treatment with absorbents such as carbon or silica.

The organic polyisocyanates containing isocyanurate rings used in our invention may be prepared by the polymerisation of polyisocyanates in presence of the catalysts known to assist this polymerisation. For example a diisocyanate either alone or in a suitable inert solvent may be heated with a basic catalyst such as an aliphatic tertiary amine, a basic metallic compound such as an alkali or alkaline earth metal oxide, hydroxide, carbonate, alcoholate or phenate, an alkali metal derivative of an enolisable compound or a metallic salt of a weak organic acid. Co-catalysts may be used such as alcohols, phenols, mono-N-substituted carbamic esters or cyclic oxides.

Especially suitable polyisocyanates for preparation of the organic polyisocyanates containing isocyanurate rings are aromatic diisocyanates such as tolylene-2:4-diisocyanate, tolylene-2:6-diisocyanate, diphenylmethane-4:4'-diisocyanate, 3-methyldiphenylmethane-4:4'-diisocyanate, naphthalene-1:5-diisocyanate, diphenyl-4:4'-diisocyanate, 4:4'-diisocyanate-3:3'-dimethyldiphenyl, 1:3:5-triisopropylbenzene-2:4-diisocyanate, and diphenyletherdiisocyanate and mixtures of these. It is preferred that the polymerisation should be such that more than 65% of the isocyanate groups have been reacted in the polymerisation of the diisocyanate.

The organic polyisocyanate containing isocyanurate rings may be derived from an aliphatic or cycloaliphatic diisocyanate such as may be used in preparing the isocyanate-ended polyurethane. Compositions containing such isocyanurate polyisocyanates afford surface coatings of particularly high light stability. However these compositions are slow drying although they can be improved in this respect by the addition of catalysts such as certain metal carboxylates or tertiary amines or of other compounds which act so as to increase the reactivity of the system.

Catalysts used in the preparation of these organic isocyanurate polyisocyanates should be neutralized or removed by the methods as hereinbefore described before the isocyanurate polyisocyanates are used in the composition of our invention. If desired the isocyanurate polyisocyanates may before use be treated as hereinbefore described to remove toxic volatile isocyanates.

The compositions of our invention may be obtained by blending the ingredients together in any order. The relative proportions of isocyanate-ended polyurethane and isocyanurate polyisocyanates are preferably within the range from 12:1 to 1:12, but proportions outside this range may be used if desired. The drying properties of the lacquer are particularly fast with high proportions of the isocyanurate. High proportions of the isocyanate-ended polyurethane lead to coatings having a high degree of flexibility but slower drying speeds. This ability to vary the properties of the composition by simple alteration in the proportions of the active components is a further advantage of the compositions of our invention.

The solvent used in the composition of our invention should be non-reactive to isocyanates and may be for example an ester, or ketone, or mixtures of these with for example hydrocarbon, or halogenated hydrocarbon. Suitable solvents are urethane grades of esters and ketones such as ethyl acetate, ethoxyethyl acetate, butoxyethyl acetate, methylethylketone, methylisobutylketone, methoxyhexanone which may be mixed with aromatic hydrocarbon solvents, for example xylene.

In some cases there is a considerable increase in viscosity of the composition during storage, which may be due to reaction of the few residual hydroxyl groups in the isocyanurate-ended polyurethane wtih isocyanate groups. To avoid this vicosity increase during storage it is desirable to heat the composition after mixing the components at a temperature between 40 and 150° C. and preferably between 60 and 100° C. for several hours.

The use of these compositions represents a further feature of our invention. The compositions may be applied to substrates by spraying, brushing, dipping, flowing or by roller. Other ingredients such as pigments, fillers, flowing-out agents such as nitrocellulose, ethyl cellulose or cellulose acetobutyrate or other polymeric materials may be added before application. Other polyisocyanates, such as the reaction products of diisocyanates with polyhydric alcohols or mixtures of these containing two or more hydroxyl groups per molecule, may also be added in order for example to increase adhesion to metals. It is desirable that such additives be dried if necessary before use in the composition of our invention.

The coatings may be left to dry in the air at room temperatures or may be heated for example at temperatures up to 150° C. The rate of drying varies with the temperature and the humidity of the atmosphere and may be considerably increased by such heating, particularly in the presence of small amounts of steam. The drying speed may also be increased by the addition of catalysts such as dibutyltin dilaurate, stannous octoate, or organic tertiary amines such as dimethylbenzylamine, but the use of such catalysts is not usually desirable since they reduce the pot-life greatly. As examples of suitable substrates there may be mentioned, wood, rubber, metals, glass, fabrics, leather, linoleum, paper and polymeric materials such as polyamides and polyvinylchloride. The compositions may also be used as adhesives or bonding agents.

The invention is illustrated but not limited by the following examples in which all parts and percentages are by weight unless otherwise stated.

EXAMPLE 1

(A) Preparation of polyisocyanate containing isocyanurate rings

A solution of 300 parts of 77:23 mixture of 2:4- and 2:6-tolylene diisocyanates in 450 parts of butylacetate containing 0.017% water was polymerised at 55° C. in the presence of 0.25 part of phenol and 2.1 parts of a solution of calcium naphthenate (4% calculated as calcium) in white spirit.

After 21 hours the catalyst was neutralised with 0.141 part of phosphoric acid to give a solution of polyisocyanurate containing 5.79% of isocyanate groups.

(B) Preparation of isocyanate-ended polyurethane 500 parts of a polyester prepared from ethylene glycol and adipic acid having a hydroxyl number of 98.0 mg. KOH/g. and an acid value of 1.2 mg. KOH/g., 260 parts of 2-ethoxyethylacetate and 0.75 part of adipic acid whre heated together to 55° C. under an atmosphere of dry nitrogen and 104 parts of an 80:20 mixture of 2:4- and 2:6-tolylene diisocyanate added. The temperature of the mixture was raised to 90° C. and maintained at this temperature for 8 hours. 172 parts of toluene were added to the resulting mixture to give a final solution having an isocyanate content of 1.34% and containing 0.2% of free unreacted tolylene diisocyanate.

(C) Preparation and application of coating compositions

The solutions of polyisocyanate containing isocyanurate rings (A) and isocyanate-ended polyurethane (B) were well mixed with urethane-grade ethoxyethyl acetate in the proportions given in Table 1. The mixtures so obtained had the pot-lives detailed in Table 1 and dried in the times given in Table 1 to give surface coatings, all of which were sufficiently flexible to give a 180° C. bend round a ⅛-inch mandrel. The coatings containing high proportions of component A had a high mar resistance and were less flexible than those coatings containing a high proportion of component B which had good abrasion resistance. All the coatings had good resistance to chemicals and solvents and all had better color and were less subject to discoloration on exposure to ultra-violet light than conventional polyurethane lacquer based on polyesters and tolyenediisocyanates.

TABLE 1

| Mixture Number | Component A (Parts) | Component B (Parts) | 2-ethoxyethyl acetate (Parts) | Drying time at 20° C. and 60% relative humidity | Pot Life (months) | Ratio of Components (calculated on solids) |
|---|---|---|---|---|---|---|
| 1 | 200 | 68.4 | 31.6 | 30 minutes | 6 | 2:1 |
| 2 | 100 | 68.4 | 31.6 | 1 hour | 6 | 1:1 |
| 3 | 100 | 136.8 | 63.2 | 1.5 hours | 6 | 1:2 |
| 4 | 100 | 205.2 | 94.8 | 4.0 hours | 6 | 1:3 |
| 5 | 100 | 273.6 | 126.4 | 8.0 hours | 6 | 1:4 |
| 6 | 100 | 342.0 | 158.0 | 16.0 hours | 6 | 1:5 |

EXAMPLE 2

Preparation of isocyanate-ended polyurethane 2336 parts of adipic acid, 861 parts of ethylene glycol and 453 parts of propylene glycol were heated together at 240° C. to give a polyester of hydroxyl number 120.9 mg. KOH/g. and acid value 2.2 mg. KOH/g. To 911 parts of the above polyester were added 491 parts of 2-ethoxyethylacetate and 232 parts of an 80:20 mixture of 2:4- and 2:6-tolylenediisocyanate. The mixture was heated at 90° C. for 12 hours to yield a solution containing 1.58% isocyanate, and 0.12% unreacted tolylene diisocyanate and having a solids content of 70%.

Preparation of surface coating

The mixtures of Example 1 were prepared using instead of the component B the solution of an isocyanate-ended polyurethane prepared as described above. The mixtures had pot-lives similar to those given in Example 1 and afforded surface coatings with comparable drying times and properties. These mixtures were superior in one respect to those of Example 1 in that application could be carried out at a lower temperature without crystallisation taking place.

EXAMPLE 3

Preparation of isocyanate-ended polyurethane

To 334.5 parts of hexamethylene diisocyanate maintained at a temperature between 70–75° C. were added over 80 minutes with stirring 239.2 parts of oxypropylated 1:2:6-hexanetriol having hydroxyl content 3.31%. After completion of the addition the mixture was stirred a further 2 hours. At this stage the reaction mixture contains 25.2% of isocyanate groups and consists essentially of a solution of the urethane polyisocyanate formed by the reaction of the oxypropylated triol and 3 molecules of hexamethylene diisocyanate, in excess hexamethylene diisocyanate.

The reaction mixture is then heated to a temperature between 130–135° C. and maintained at this temperature for a total of 40 hours, by which time the content of isocyanate groups had fallen to 20.86%. A dry nitrogen atmosphere was maintained throughout the reaction.

Unreacted hexamethylene diisocyanate was then removed by distillation at 120° C. and a pressure of 1.6 mm. of mercury in a thin film distillation apparatus. The 472 parts of reaction mixture furnished 306.6 parts of nonvolatile product as a viscous pale yellow liquid containing 7.4% of isocyanate groups and 0.1% free hexamethylene diisocyanate. This product is essentially a further reaction product of hexamethylene diisocyanate with the hexamethylene diisocyanate/oxypropylated 1:2:6 hexane triol urethane triisocyanate formed in the early part of the reaction. The volatile portion (161–3 parts) is essentially hexamethylene diisocyanate.

Preparation of coating compositions

The isocyanate-ended polyurethane prepared as described above was mixed with the solution of polyisocyanate containing isocyanurate rings (A, prepared as described in Example 1) and urethane-grade ethoxyethyl acetate to give compositions similar to those described in Example 1. Table 2 shows that these compositions had a slower drying speed than the compositions of Example 1. The coatings obtained were similar to those prepared in Example 1 but were of better color, had improved color retention on exposure to light, and had increased resistance to chemicals and solvents.

TABLE 2

| Component A (Weight of solid resin) (Parts) | Isocyanate-ended Polyurethane (Parts) | Drying time at 20° C. and 60% relative humidity |
|---|---|---|
| 2 | 1 | 30 minutes. |
| 1 | 1 | 1 hour. |
| 1 | 2 | 4 hours. |
| 1 | 3 | 12 hours. |
| 1 | 4 | 24 hours. |

EXAMPLE 4

To 445.6 parts of hexamethylene diosicyanate maintained at a temperature between 70° and 75° C. were added over 1 hour with stirring 150 parts of oxypropylated 1:2:6-hexanetriol having hydroxyl content of 7.0%. After completion of the addition the mixture is stirred a further 2 hours. At this stage the mixture contains 32.36% of isocyanate groups and consists essentially of a solution of the urethane polyisocyanate formed by the reaction of the oxypropylated triol and 3 molecules of hexamethylene diisocyanate in excess hexamethylene diisocyanate.

The reaction mixture is then heated to a temperature between 130° and 135° C. and maintained at this temperature for a total of 43 hours by which time the content of the isocyanate groups had fallen to 26%. A dry nitrogen atmosphere was maintained throughout the reaction.

Unreacted hexamethylene diisocyanate was then removed as described in Example 3, 488 parts of reaction mixture affording 276.8 parts of non-volatile product as a viscous yellow liquid containing 11.25% of isocyanate groups and less than 0.1% free hexamethylene diisocyanate.

Preparation of surface coatings

The procedures of Example 3 were repeated using the isocyanate ended polyurethane prepared as described above in place of that prepared as described in Example 3. Similar compositions were obtained with exceptionally good color and color-retention and resistance to chemicals and solvents with drying speeds equal to those of Example 3 and a little slower than those of the compositions described in Examples 1 and 2.

EXAMPLE 5

Preparation of isocyanate-ended polymethane 2336 parts of adipic acid and 1800 parts of 1:3-butylene glycol are heated together at 225° C. to give a polyester of hydroxyl number 85.5 g. KOH/g. and acid value 3.1 mg. KOH/g. To 933 parts of the above polyester are added 174 parts of an 80:20 mixture of 2:4- and 2:6-tolylene diisocyanate and the mixture is heated to 90° C. under an atmosphere of dry nitrogen and maintained at this temperature for 12 hours. The product is cooled and 400 parts of butyl acetate added to give a solution containing 1.35% of isocyanate groups and 0.05% of unreacted tolylene diisocyanate.

Preparation of coating composition

The isocyanate-ended polyurethane so obtained is mixed with the polyisocyanate containing isocyanurate rings described in Example 1 and the mixture heated at 90° C. for four hours. Viscosity stable solutions are obtained which afford surface coatings similar to those obtained in Example 1.

We claim:

1. New compositions, suitable for the preparation of surface coatings by reaction with moisture in the atmosphere after application to a surface, comprising a solution in a solvent inert to isocyanates of an isocyanate-ended polyurethane of average molecular weight more than 1000, which is soluble in said solvent and which is obtained by reaction of a polyhydroxy compound of molecular weight more than 400 and a polyisocyanate in amount sufficient to provide at least 1.05 isocyanate groups for each hydroxyl group present, and polymerized organic diisocyanate having isocyanurate rings, in which the proportions of polyurethane to polymerised diisocyanate by weight lie between the limits of 1:12 and 12:1.

2. A composition as claimed in claim 1 wherein the polyurethane is a reaction product of an aromatic diisocyanate with a polyesterification product of an aliphatic dicarboxylic acid and at least one aliphatic diol and the polymerised organic diisocyanate is a polymerised monocyclic aromatic diisocyanate.

3. A composition as claimed in claim 2 wherein the polyurethane is a reaction product of tolylene diisocyanate and an adipic acid/ethylene glycol/propylene glycol polyester and the polymerised organic diisocyanate is a polymerised tolylene diisocyanate.

References Cited

UNITED STATES PATENTS

| 2,801,244 | 7/1957 | Balon | 260—248 |
| 2,929,800 | 3/1960 | Hill | 260—77.5 |
| 2,978,449 | 4/1961 | France et al. | 260—248 |
| 3,075,979 | 1/1963 | Tazuma et al. | 260—248 |
| 3,115,479 | 12/1963 | Windemuth et al. | 260—47 |
| 3,135,711 | 6/1964 | Thoma et al. | 260—30.4 |
| 3,248,372 | 4/1966 | Bunge | 260—77.5 |
| 3,252,942 | 5/1966 | France et al. | 260—77.5 |
| 3,280,066 | 10/1966 | France et al. | 260—31.2 |

FOREIGN PATENTS

| 635,894 | 2/1962 | Canada. |
| 750,482 | 1/1967 | Canada. |

DONALD E. CZAJA, Primary Examiner.

M. J. WELSH, Assistant Examiner.

U.S. Cl. X.R.

117—124, 132, 138.8, 142, 148, 155; 156—331; 260—13, 18, 31.2, 31.4, 32.8, 33.6, 77.5